United States Patent [19]
LaBerge et al.

[11] Patent Number: 5,671,369
[45] Date of Patent: Sep. 23, 1997

[54] BUS GRANT OVERLAP CIRCUIT

[75] Inventors: Paul A. LaBerge, Coon Rapids; Gregory B. Wiedenman, Woodbury, both of Minn.; Donald E. Harding, Downingtown, Pa.

[73] Assignee: Unisys Corporation, Blue Bell, Pa.

[21] Appl. No.: 587,772

[22] Filed: Dec. 22, 1995

[51] Int. Cl.$^6$ .................................................. G06F 13/00
[52] U.S. Cl. .................................. 395/287; 395/856
[58] Field of Search .............................. 395/287, 297, 395/298, 856, 865

[56] References Cited

U.S. PATENT DOCUMENTS

| | | | |
|---|---|---|---|
| 4,947,368 | 8/1990 | Donaldson et al. | 395/287 |
| 4,980,854 | 12/1990 | Donaldson et al. | 395/325 |
| 5,237,696 | 8/1993 | Best | 395/725 |
| 5,301,282 | 4/1994 | Amini et al. | 395/325 |
| 5,388,228 | 2/1995 | Heath et al. | 395/325 |
| 5,389,831 | 2/1995 | Eisenstadt | 327/161 |
| 5,416,910 | 5/1995 | Moyer et al. | 395/325 |
| 5,473,762 | 12/1995 | Krein et al. | 395/287 |
| 5,506,972 | 4/1996 | Heath et al. | 395/293 |
| 5,532,633 | 7/1996 | Kawai | 327/174 |
| 5,550,875 | 8/1996 | Bennett | 375/356 |

*Primary Examiner*—Ayaz R. Sheikh
*Attorney, Agent, or Firm*—Charles A. Johnson; Mark T. Starr

[57] ABSTRACT

A circuit employing two delayed bus clock signals and timer logic to minimize the dead bus time occurring between consecutive bus drivers and providing additional protection against multiple, simultaneous bus drivers for a communications bus in a computer system. Skewed enable and disable clock signals based on an original bus clock feed combinational logic to set a transceiver enable line when control of the bus is granted for bus transfers. Bus transfers remain enabled, through use of a feedback path, as long as a bus grant signal is active. When the last cycle of the bus transfer occurs, or a bus transfer error occurs, the transceiver enable line goes inactive, thereby allowing other components coupled to the bus to gain control. Test mode and bus transfer status lines provide further mechanisms for controlling bus transfer operation.

10 Claims, 3 Drawing Sheets

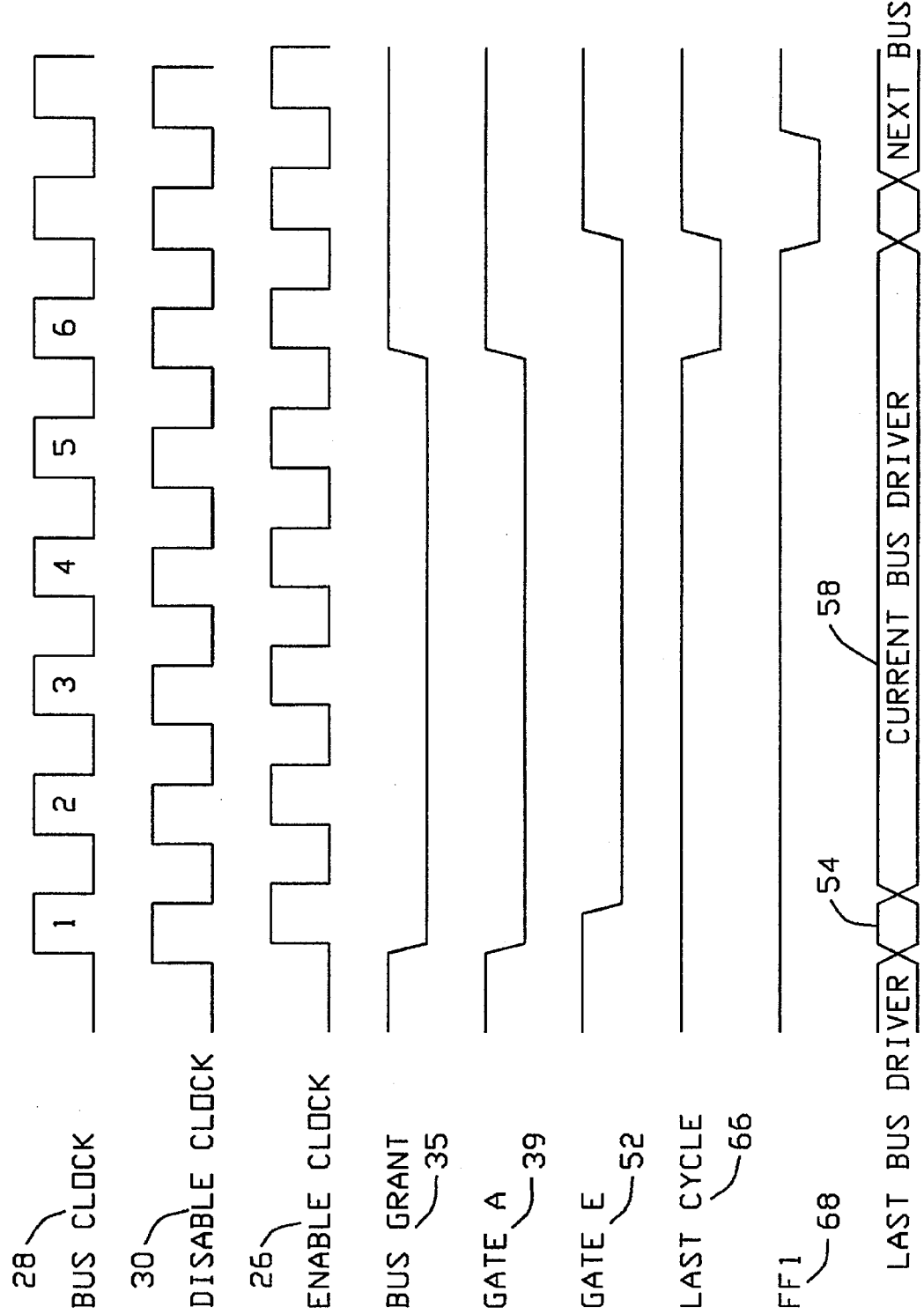

BUS GRANT OVERLAP CIRCUIT

BACKGROUND OF THE INVENTION

1. Field of the Invention

This invention relates generally to a communications bus within a data processing system. More specifically, it relates to a circuit for minimizing dead bus time between consecutive bus driver accesses.

2. Background Information

A bus is an electronic pathway in a digital computer system that provides a communication path for data to flow between the central processing unit (CPU) and its memory and between and among the CPU and various peripheral devices connected to the computer. A bus contains one wire for each bit needed to specify the address of a device or location in memory, plus additional wires that distinguish among various data operations to be performed. A bus can transmit data in either direction between any two components of the computing system. A component that needs to send data over the bus is called a driver. A driver obtains control (also known as mastership) of the bus to send data to a receiving component if no other component connected to the bus is currently sending data. Data may be driven on the bus by only one component at a time, otherwise bus errors will occur during the multiple data transmissions and components connected to the bus may become damaged. After control is obtained by a driver and the data is sent, control is then relinquished so that other components in the computer system may access the bus without causing bus errors. The time period from the relinquishing of control of the bus until another component obtains control of the bus is cared dead time, because no productive use of the bus is occurring during this time. One way to improve the overall performance of the bus is to minimize the amount of dead time occurring as one driver relinquishes control of the bus and the next driver is enabled onto the bus. A typical bus design allows for one bus clock cycle of dead time between consecutive bus drivers. This dead time can has a negative impact on bus performance, especially when the average bus transfer length is only several bus clock cycles long. Circuitry to ensure that the dead time is minimized would be a valuable addition to the communication bus art.

SUMMARY OF THE INVENTION

An object of this invention is to improve the performance of a communications bus which is part of a computer system.

Another object of this invention is to improve the performance of a bus by minimizing the dead time between consecutive bus accesses.

Yet another object of this invention is to protect against multiple simultaneous bus drivers on a communications bus in a computer system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a novel circuit for minimizing dead time in the use of a bus in a computer system. The present invention uses skewed clocks to generate bus enable signals such that less time is wasted between consecutive bus drivers. The present invention also includes a self-policing mechanism which deactivates bus enables automatically upon transfer completion, even if the bus arbitration logic did not terminate the cycle. This mechanism helps prevent multiple components from simultaneously driving the bus. Most bus designs waste an entire bus clock cycle between consecutive transfers. This has the effect of reducing bus bandwidth, particularly if the average transfer is only several cycles long. The present invention reduces this dead time to approximately one-half of a cycle.

The bus grant overlap circuit of the present invention attains the above-mentioned advantages by providing a bus access (transceiver) enable line for indicating that the bus unit containing the bus grant overlap circuit has been given control of the bus. The bus provides a bus clock signal over a bus clock line and a bus grant signal over a bus grant line. Two sets of delay logic skew the bus clock signal received from the bus. The first delay outputs a disable clock signal and the second delay outputs an enable clock signal. The skewed clocks are input to overlap circuitry for accepting the delayed bus clock signals. The overlap circuitry activates the bus access enable line to initiate a current bus transfer when the bus grant line is activated and deactivates the bus access enable line when the bus grant line is deactivated or when the current bus transfer's last clock cycle has occurred. By using the skewed clock signals, the overlap circuit controls bus accesses such that the inactive or dead time between consecutive bus transfers is kept to a minimum.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIG. 3 is a timing diagram for the bus grant overlap circuit.

DESCRIPTION OF THE PREFERRED EMBODIMENT

Figure 1:
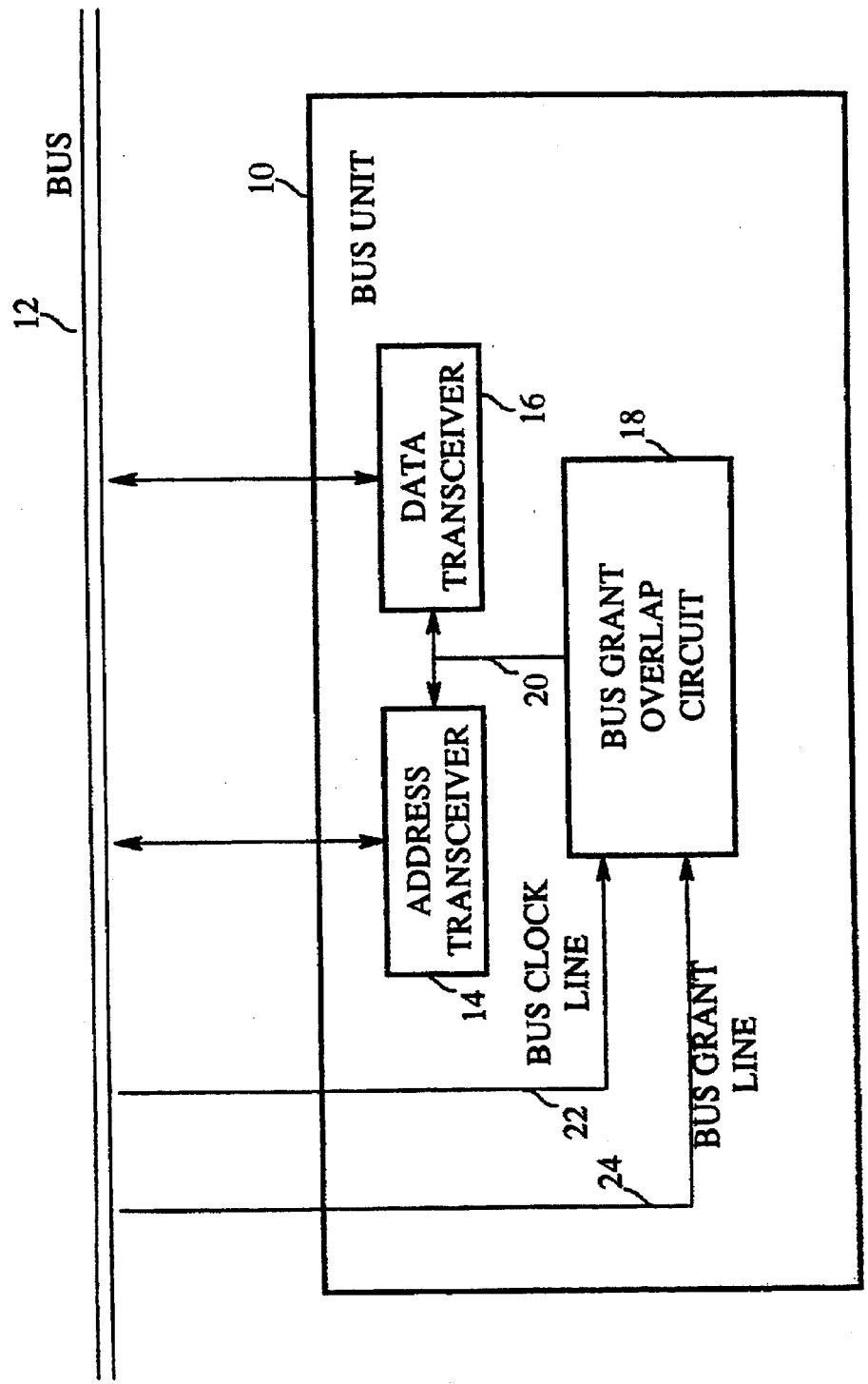
FIG. 1 is a block diagram of the connection between the bus grant overlap circuit of the present invention and the bus.

FIG. 1 is a block diagram of the connection between the bus grant overlap circuit of the present invention and the bus. A Bus Unit 10 is connected to a Bus 12 for the transmission and reception of data, address, and control signals. The Bus Unit 10 is a memory device or other peripheral within a computer system. The Bus Unit 10 writes address signals to the Bus and receives address signals from the Bus through Address Transceiver 14. The Bus Unit writes data signals to the Bus and receives data signals from the Bus through Data Transceiver 16. The Bus Grant Overlap Circuit 18 controls access by the Bus Unit 10 to the Bus 12 by Transceiver Enable Line 20. In the preferred embodiment of the present invention, each component or device coupled to the Bus contains a Bus Grant Overlap Circuit. When the Transceiver Enable Line 20 is low, Address Transceiver 14 and Data Transceiver 16 access the Bus 12 according to bus control signals (not shown). When the Transceiver Enable Line 20 is high, Address Transceiver 14 and Data Transceiver 16 cannot access the Bus. The Bus Grant Overlap Circuit utilizes two signals in controlling access to the Bus. The Bus Clock signal arrives over the Bus Clock Line 22. In the preferred embodiment, the bus clock is a 50 megahertz (Mhz) clock. The Bus Grant signal arrives over the Bus Grant Line 24. The Bus Grant signal indicates that the Bus Unit 10 has been given control of the Bus 12 and it may now transfer data over the Bus.

Figure 2:
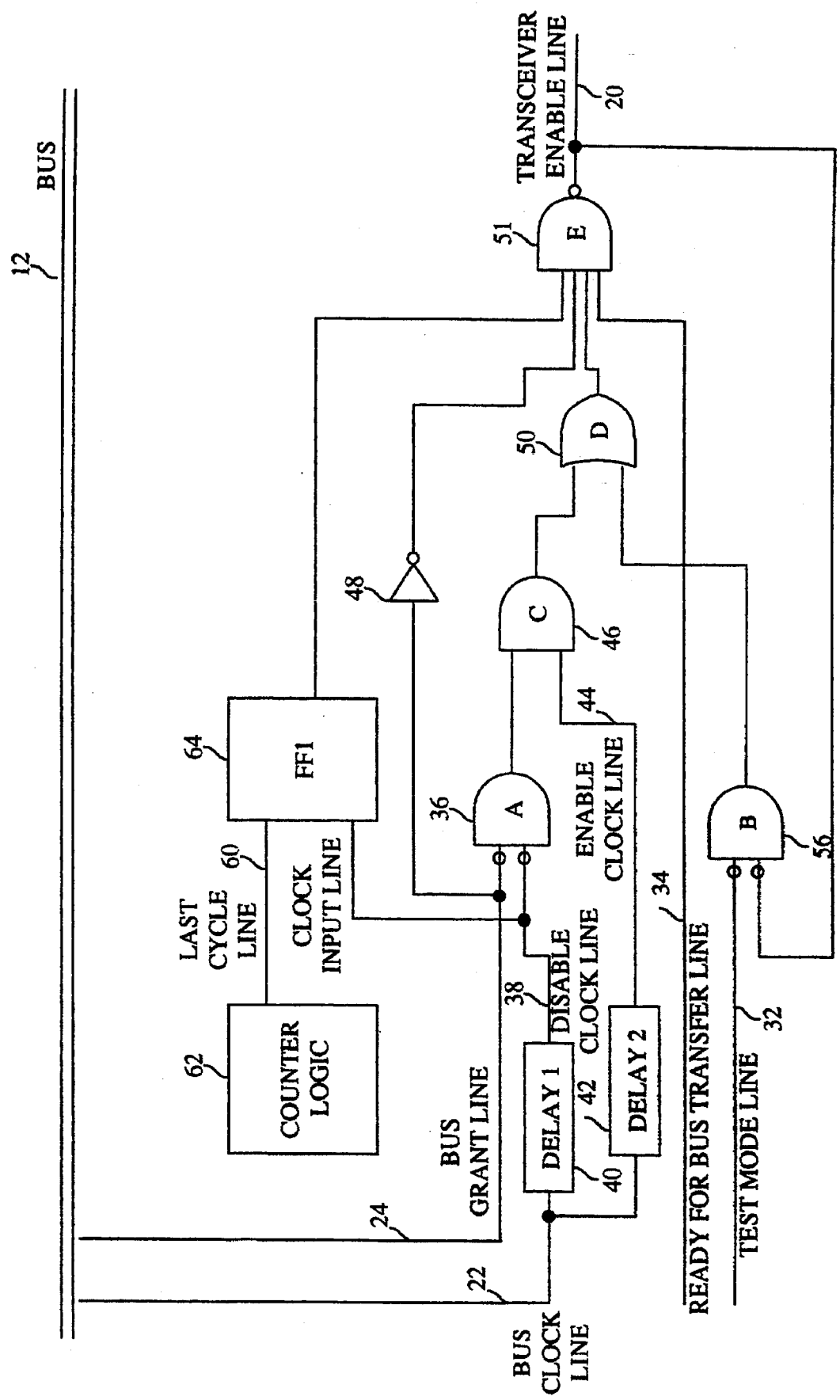
FIG. 2 is a circuit diagram of bus grant overlap circuit.

FIG. 2 is a circuit diagram of Bus Grant Overlap Circuit. The Bus 12 is coupled to the Bus Grant Overlap Circuit by the Bus Clock 22 Line and the Bus Grant Line 24. The focus of this circuit is the two skewed clock signals generated from the 50 Mhz bus clock. The first signal is the Disable Clock, and the second is the Enable Clock. FIG. 3 is a liming diagram for the bus grant overlap circuit. The liming diagram shows the two skewed clock signals in relation to the original bus clock signal from the Bus Clock Line 22. The rising edges of the Enable Clock 26 follow the rising edges of the Bus Clock 28 by several nanoseconds. Conversely, the rising edges of the Disable Clock 30 precede the rising edges of the Bus Clock 28 by several nanoseconds. These two skewed clock signals, along with the rest of the circuit, are used to set, then clear, the Transceiver Enable Line 20. The net result of the skewed clock signals is a window of only several nanoseconds during which the Bus 12 is inactive between consecutive bus transfers. The example of FIG. 3 assumes a bus transfer lasting six clock cycles.

The operation of the Bus Grant Overlap Circuit is best explained by example. Assume the Bus Unit 10 of FIG. 1 is waiting to use the Bus 12. Refer back to FIG. 2. At this time, Test Mode Line 32 will be inactive because this mode of circuit operation is only used for test purposes. Thus, in an operational mode, the Test Mode Line is always tied low. The Ready For Bus Transfer Line 34 will be active, because it is active anytime that the Bus Unit 10 is capable of accessing the Bus 12. Hence, at any time after system or Bus Unit initialization, the Ready For Bus Transfer Line 34 is active. Eventually, the bus arbitrator (not shown) will send the low-active signal on the Bus Grant Line 24. This means that the Bus Unit 10 will gain control of the Bus. The rising edge of the Bus Clock 28 on FIG. 3 corresponds to the start of the low value on Bus Grant 35. The low-active signal on the Bus Grant Line 24 causes "AND" Gate A 36 to be made as soon as the Disable Clock Line 38 drops. The Bus Clock Line 22 operates on a 20 nanosecond cycle. It goes high for 10 nanoseconds and then low for 10 nanoseconds. Thus, Delay 1 40 skews the Bus Clock, thereby affecting the Disable Clock Line. In the preferred embodiment, the delay for Delay 1 40 is 17.1 nanoseconds. The Bus Clock signal is also fed to Delay 2 42. Delay 2 skews the Bus Clock affecting the Enable Clock line 44. In the preferred embodiment, the delay for Delay 2 is 11.8 nanoseconds.

Once "AND" Gate A 36 is made, then "AND" Gate C 46 is made for the time during which the Enable Clock Line 44 is still active. Inverter 48 inverts the low signal on the Bus Grant Line 24 to a high signal input to "NAND" Gate E 51. As a result of "AND" Gate C 46 being made, "OR" Gate D 50 is also made. Next, all input lines are active for "NAND" Gate E 50, thus Transceiver Enable Line 20 is driven to the active state, thereby allowing Address Transceiver 14 and Data Transceiver 16 of the Bus Unit 10 to access the Bus 12. Referring to FIG. 3, when Gate E 52 drops low, the current bus driver has control of access to the Bus for the current bus transfer. Note that the first dead time 54 begins at the start of the rising edge of the Bus Clock 28 and ends on the falling edge of the Disable Clock 30. This time period is less than one Bus Clock cycle. Referring back to FIG. 2, when the Transceiver Enable Line 20 is low, the wrap (or feedback) path from "NAND" Gate E 51 to "AND" Gate B 56 then causes the combinational state device comprised of "AND" Gate A 36, "AND" Gate B 56, "AND" Gate C 46, "OR" Gate D 50, and "NAND" Gate E 51 to "latch" the transceiver enable state. This state will subsist as long as the bus transfer is occurring (see Current Bus Driver 58 on FIG. 3). Note that activating the Test Mode via Test Mode Line 32 or dropping the Ready For Bus Transfer Line 34 would cause the Bus Unit 10 to be disabled from the Bus 12.

The combinational state device will be cleared by one of two conditions. When normal termination of a bus transfer occurs, the Last Cycle Line 60 will caused the state device to be cleared. This Last Cycle signal is generated by Counter Logic 62. Counter Logic 62 monitors the remaining number of bus cycles in the current bus transfer. Counter Logic 62 activates the Last Cycle Line during the last bus cycle of the transfer, such that Flip-Flop FFI 64 is set upon receipt of the next rising clock edge of the Disable Clock (as transferred on Clock Input Line 65 on FIG. 2 and as shown on FIG. 3). This knocks down "NAND" Gate E 51, clearing the state device. On FIG. 3, the change in state of Last Cycle 66 is followed by a change in FFI 68. This causes a change in state of Gate E 52. Counter Logic 62 on FIG. 2 provides an important "self-policing" function. If a hardware fault results in a Bus Grant signal which is not deactivated upon the end of a bus transfer, the Bus Unit 10 automatically relinquishes control of the Bus 12 without external prompting.

The combinational state device can also be cleared by the deactivation of the Bus Grant signal on the Bus Grant Line 24. When Bus Grant Line 24 goes high, the output of Inverter 48 goes low, thus knocking down "NAND" Gate E 51. This will occur in the middle of a bus transfer as a result of a transfer error. If the bus transfer terminates normally, the Bus Grant signal is deactivated following the last bus cycle of the transfer, by which time the Last Cycle has already cleared the state device (see FIG. 3).

One skilled in the art can see that FIG. 3 shows the effect of using the skewed clocks to set, then clear, the state device. The bus driver enables are activated shortly after the start of the transfer's first bus cycle, and disabled shortly before the end of the last bus cycle. Thus, the bus is inactive for approximately one-half bus cycle every transfer. This effectively increases bus bandwidth, since an entire bus cycle of dead time is not wasted between consecutive bus drivers.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

We claim:

1. A bus grant overlap circuit for minimizing inactive bus time between transfers on a bus, the bus providing a bus clock signal on a bus clock line and a bus grant signal on a bus grant line, comprising:

a bus access enable line;

first delay means coupled to the bus clock line for delaying the bus clock signal for a first predetermined time;

second delay means coupled to the bus clock line for delaying the bus clock signal for a second predetermined time; and overlap means coupled to the bus grant line, said first delay means, said second delay means, and said bus access enable line for accepting said first delayed bus clock signal and activating said bus access enable line to initiate a current bus transfer when the bus grant line is activated, and for accepting said second delayed bus clock signal and deactivating said bus access enable line to halt said current bus transfer when the bus grant line is deactivated or when said current bus transfer's last clock cycle has occurred, whereby time between consecutive bus transfers over the bus is shortened.

2. The circuit of claim 1, wherein said overlap means includes counter means for counting the number of cycles in said current bus transfer and for activating a last cycle line when said last clock cycle of said current bus transfer occurs.

3. The circuit of claim 2, wherein said overlap means further includes flip-flop means coupled to said last cycle line for accepting a last cycle signal indicating end of said current bus transfer.

4. The circuit of claim 1, wherein said overlap means includes inverter means coupled to the bus grant line for causing deactivation of said bus access enable line thereby halting said current bus transfer when the bus grant line is deactivated.

5. The circuit of claim 1, wherein said overlap means includes test mode means for causing deactivation of said bus access enable line thereby halting said current bus transfer when circuit test processing is initiated.

6. A bus grant overlap circuit for use in a bus unit connected to a communications bus in a computer system, for minimizing inactive bus time between bus transfers on the bus, the bus providing a bus clock signal on a bus clock line and a bus grant signal on a bus grant line, comprising:

a bus access enable line;

a first delay circuit connected to the bus clock line to delay the bus clock signal for a first predetermined time;

a second delay circuit connected to the bus clock line to delay the bus clock signal for a second predetermined time; and an overlap circuit connected to the bus grant line, said first delay circuit, said second delay circuit, and said bus access enable line to accept said first delayed bus clock signal and activate said bus access enable line to initiate a current bus transfer when the bus grant line is activated, and to accept said second delayed bus clock signal and deactivate said bus access enable line to halt said current bus transfer when the bus grant line is deactivated or when said current bus transfer's last clock cycle has occurred, whereby time between consecutive bus transfers over the bus is shortened.

7. The circuit of claim 6, wherein said overlap circuit includes counter logic to count the number of cycles in said current bus transfer and to activate a last cycle line when said last clock cycle of said current bus transfer occurs.

8. The circuit of claim 7, wherein said overlap circuit further includes a flip-flop connected to said last cycle line for accepting a last cycle signal indicating end of said current bus transfer.

9. The circuit of claim 6, wherein said overlap circuit includes an inverter connected to the bus grant line to cause deactivation of said bus access enable line thereby hailing said current bus transfer when the bus grant line is deactivated.

10. The circuit of claim 6, wherein said overlap circuit includes a test mode line to cause deactivation of said bus access enable line thereby halting said current bus transfer when circuit test processing is initiated.

* * * * *